United States Patent [19]

Galanty et al.

[11] Patent Number: 5,044,809
[45] Date of Patent: Sep. 3, 1991

[54] TWO PART AXIAL DRIVE DEVICE EACH HAVING SELF CONTAINED BEARING SEALING MEANS

[75] Inventors: William B. Galanty, Short Hills; Joseph Kennedy, Emerson, both of N.J.

[73] Assignee: Franklin Miller, Inc., Livingston, N.J.

[21] Appl. No.: 500,920

[22] Filed: Mar. 29, 1990

[51] Int. Cl.[5] .............................................. F16D 1/00
[52] U.S. Cl. ..................................... 403/24; 403/288; 241/46.06; 384/480
[58] Field of Search ................... 241/46.06, 243, 46 R; 384/480, 481; 277/85, 92; 403/24, 26, 288

[56] References Cited

U.S. PATENT DOCUMENTS

| | | | |
|---|---|---|---|
| 3,921,962 | 11/1975 | Feger et al. | 277/92 X |
| 4,186,888 | 2/1980 | Galanty | 241/46.06 |
| 4,253,713 | 3/1981 | Chambers, Sr. | 384/132 X |
| 4,482,194 | 11/1984 | Chambers, Sr. | 384/480 |
| 4,491,278 | 1/1985 | Galanty | 241/46.06 |
| 4,707,150 | 11/1987 | Graham | 384/481 |
| 4,881,829 | 11/1989 | Koelsch | 384/480 X |

Primary Examiner—Andrew V. Kundrat
Attorney, Agent, or Firm—Clay Holland, Jr.

[57] ABSTRACT

An improved two part detachable shaft device is connected to a rotatable cutting and shredding member of a comminutor. When these detachable shaft devices are mechanically key connected to the rotatable member along the axis of the comminutor on opposite sides thereof, the shafts and rotatable member form an effective unitary rigidly mounted rotor along the axis of the comminutor and perpendicular to the flow of fluid through the comminutor. Each detachable shaft device provides a unique and convenient means whereby a comminutor cutting and shredding member or both or either shaft device may be readily and efficiently removed for repair or replacement. Each of the detachable shaft devices includes a unique bearing sealing arrangement into which each end of the shaft not connected to the rotatable member extends. One shaft is characterized as the blind side, which provides axial support and sealing of the rotor only, while the other shaft is characterized as the drive side, which provides axial support, fluid sealing and torsion drive through the shaft to the rotor within the comminutor.

10 Claims, 3 Drawing Sheets

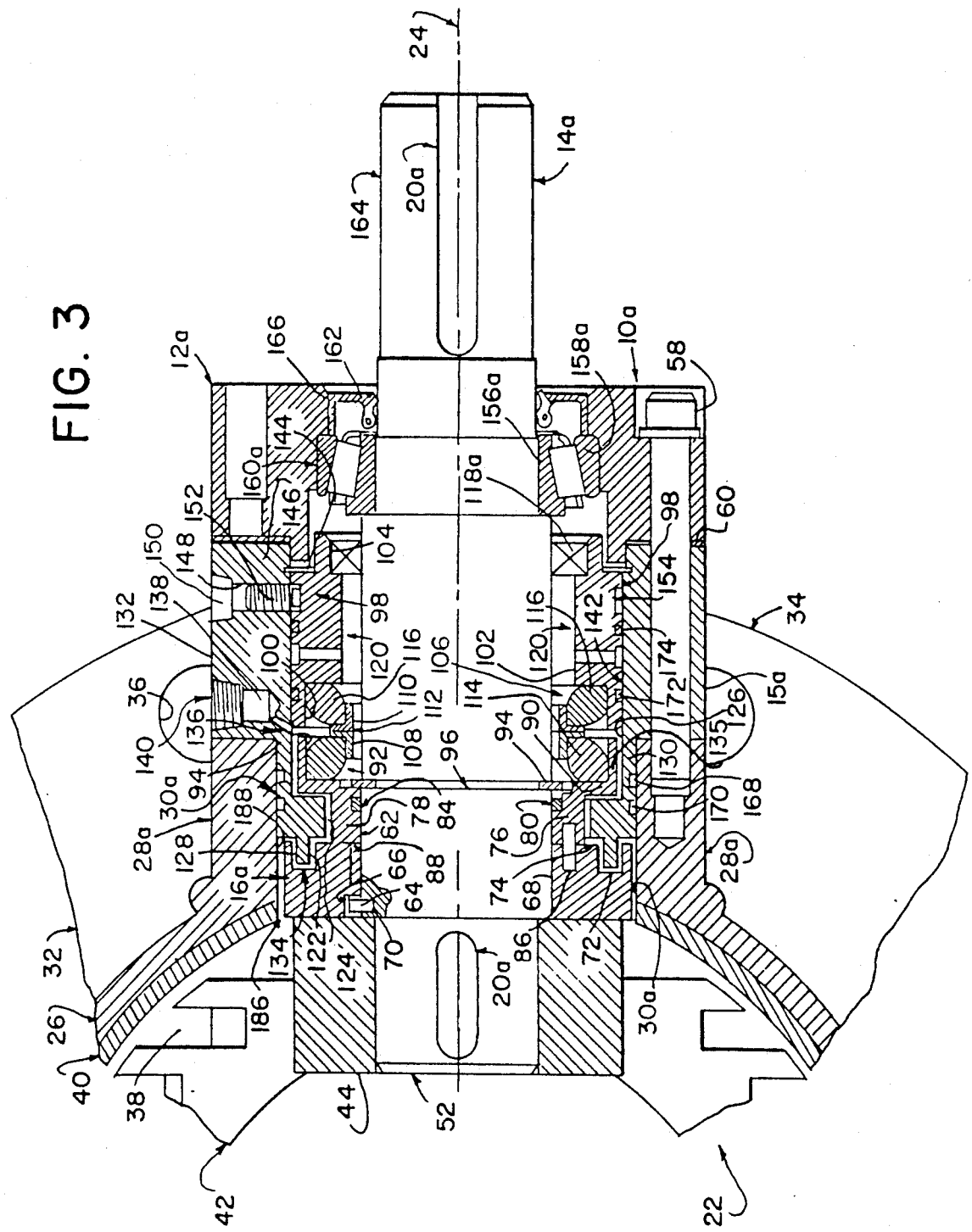

TWO PART AXIAL DRIVE DEVICE EACH HAVING SELF CONTAINED BEARING SEALING MEANS

FIELD OF THE INVENTION

The present invention relates to the field of comminutor machines and machine shafts which may be an integral part of a machine, that are used for transmitting torsional drive power along a shaft during operation of the machine. It also relates to the field of coupling devices that are used to connect drive shafts to a rotatable part or component of machines.

BACKGROUND OF THE INVENTION

This invention relates to and is an improvement of the present co-applicant's prior patent, U.S. Pat. No. 4,491,278, issued Jan. 1, 1985, entitled "COMMINUTOR FOR INLINE FLOW OF SEWAGE", issued to William B. Galanty; and U.S. Pat. No. 4,186,888 issued Feb. 5, 1980.

Both of the foregoing patents were primarily concerned with the provision of improved stationary cage structures and improved rotatable cutting and shredding member for comminutors. As can readily be seen from the foregoing prior art patents little, if any, attention was directed to the need for improvements in the shafts used in such comminutors. However, the need for improvement becomes obvious, when comminutors are used in hostile fluid environments such as sewage sludge processing. The problem becomes more accute when anti frictional bearings are required to facilitate the rotary efficiency of such devices and the need to protect such bearings with bearing seals.

Therefore, in the prior art it is known that shafts of various apparatus may be mounted in such anti-friction bearing arrangements in which an inner ball bearing race is fixed to the shaft and rotates with the shaft while an outer race thereof is fixedly mounted to the support housing. Unfortunately, such bearing arrangements do not provide sufficient sealibility for hostile fluid environments. Attempts have been made to provide pressure seals to one or both sides of the anti-friction bearing and between the fixed support housing and the rotating shaft. Such rotary shaft seals have been complex and the seal's integrity is difficult to maintain or repair. Where fluids acting on the seal arrangements include abrasive materials, such as gritty liquid, sewage sludge, corrosive and other problem fluids, they tend to work their way into the seal arrangements causing deterioration or destruction thereof and its integrity.

More recent prior art fluid pressure rotary shaft seal arrangements have sought to solve some of these rotary shaft seal difficulties. More specifically, in U.S Pat. No. 4,253,713, issued Mar. 3, 1981, to Joseph W. Chambers, there is disclosed a rotary seal arrangement which may be characterized by an annular bushing which rotates with the shaft an annular rotating seal race, an annular resilient seal sleeve. These various parts wear, requiring their replacement. The part subjected to wear include the major bearing and seal housing components. Maintenance down time is relatively high and replacement of parts is acheived with considerable difficulty.

In another related prior art device, U.S Pat. No. 4,482,194, issued Nov. 13, 1984, issued to Joseph W. Chambers, Sr., there is characterized a replaceable wear sleeve cartridge fixedly mounted to a housing bore carrying an internally fixed race of an anti-friction bearing and a static seal race. The wear sleeve cartridge defines a labyrinth preseal bushing fixed to the shaft, the basic elements of a labyrinth preseal and additional resiliency couples through a seal wedge, a rotating race whose end face is both fluid pressure and resiliently biased against the end face of the annular static seal race. The object of this prior art seal sleeve shaft device is the minimize the number of parts and the maintenance down time by the use of a replaceable cartridge sleeve which bears the wear during shaft seal usage. However, it still requires the apparatus to be inoperable during down time repairs.

Accordingly, it is an object of the present invention to provide a unique rotary seal shaft combination in which a shaft member and a rotary shaft seal with labyrinth bushing member are all self contained entirely within a completely detachable replaceable cartridge device.

A further object of the present invention is to provide a replaceable cartridge device in which gritty liquid, sewage sludge, corrosive and other problem liquids which may become trapped within the labyrinth seal arrangement can be readily removed through outlets provided in the cartridge housing while the apparatus to which the cartridge is connected is in operation.

Yet another object of the invention is to provide such a replacement cartridge which is detachable from the apparatus for exchange and replacement purposes to substantially minimize the down time of the apparatus and enable such replaced device to be repaired at a remote site.

Still another object of the invention is to provide rotation torsion means along an axis of a comminuting shredder axially disposed rotatable member by the use of two replaceable cartridge devices.

While another object of the invention is to provide a two unit interdependent shaft arrangement for an apparatus wherein each unit may be connected or disconnected independent of the other unit for replacement.

SUMMARY OF THE INVENTION

The present invention is directed to a detachable replaceable self-contained cartridge device having a fluid pressure assisted rotary shaft seal assembly for sealing a shaft segment supported for rotation about its axis within a housing bore by an anti-friction bearing interposed between the shaft segment and the housing bore of the self-contained replaceable cartridge device. The self-contained replaceable cartridge device comprises a body housing including a bearing housing and an annular gland member, an axially disposed rotor shaft drive member within the bore of the body housing, a static pressure sealing assembly annularly disposed about the shaft segment including an oil seal cover, an anti-friction bearing, an inner stationary seal gland, a stationary oil seal gland, a mechanical seal system, a rotary seal gland and an annular spacer. A labyrinth fluid flow path is formed within the body housing bore and the rotary spacer and stationary seal glands which terminates at a purge port outlet exit.

In one embodiment of the invention of the cartridge device, the shaft segment has a rotary key mechanism for rigidly locking to a rotatable component of an associated apparatus, while at the other end thereof is a drive key mechanism for coupling to an external drive source. In another embodiment, the shaft segment has a key mechanism similar to the other shaft segment at one end and the end is a straight foreshortened shaft end that terminates axially at the remote end of the inner race of the anti-friction bearing support member and is hidden from view by an enclosure housing cap member.

BRIEF DESCRIPTION OF THE DRAWINGS

The improved two part axial drive device of the present invention can be understood in more detail with the help of the accompanying drawings, wherein:

FIG. 3 is a detailed cross-sectional view, in part, of the first unit of the detachable axial drive device shown in FIG. 2, depicting the various internal components of the sealing arrangement and the relative space relationship of each component in the combination and the unique manner in whcih they cooperate with one another.

DETAILED DESCRIPTION OF THE INVENTION

Figure 1:
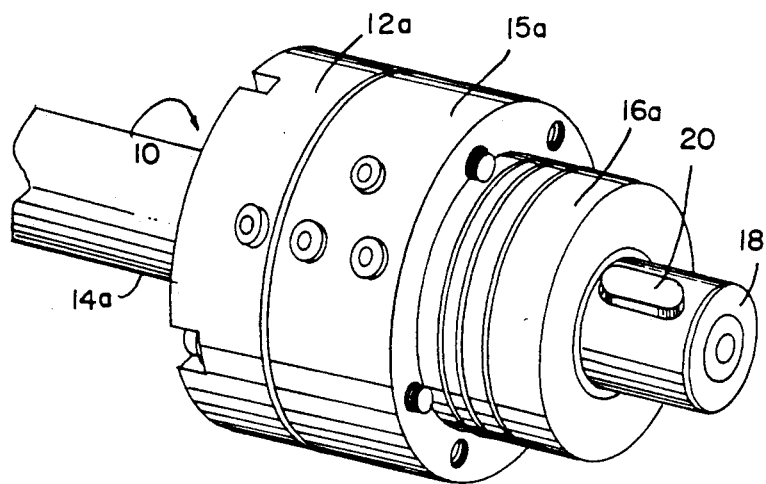
FIG. 1 depicts one of the two part axial drive devices containing its self sealing assembly.

Referring now to FIG. 1, there is shown a completely assembled device 10 depicting only one of the two part detachable axial drive devices having a self-contained bearing seal mechanism. As shown, device 10a includes an annular bearing housing end member 12a through which an axially disposed rotary shaft 14a exits. Disposed adjacent to member 12a is an annular outer housing static gland 15a and axially adjacent is disposed an annular rotary spacer member 16a connected to a rotor end 18 of shaft 14 having a rotor shaft key 20 for engaging a rotor of an associated apparatus.

Figure 2:
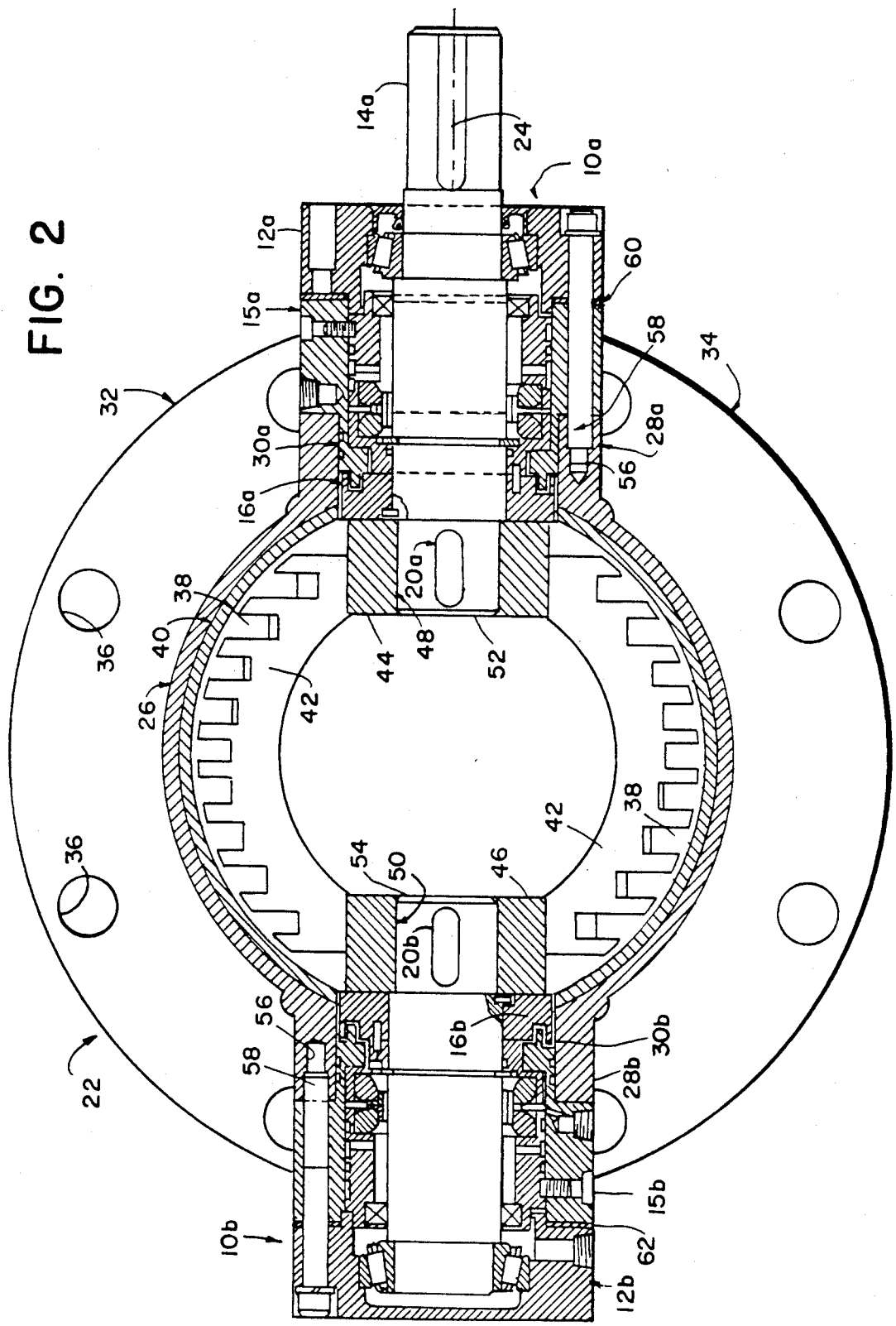
FIG. 2 depicts a cutting/shredding comminutor device partially in cross-section depicting the locations of each unit of the detachable axial drive device utilized with the comminutor to provide rotational drive to the cutting/shredding rotor thereof along the axis of the device.

Reference is now directed to FIG. 2, where there is shown a cutting/shredding comminutor apparatus 22, similar to that disclosed in the co-applicant's prior patent, U.S. Pat. No. 4,491,278. In FIG. 2, comminutor 22 has two detachable devices, generally designated 10a and 10b, connected thereto, illustrating their disposition along an axis 24 of comminutor 22 and shaft 14a.

As shown in FIG. 2, comminutor 22 includes a main body 26 of a cylindrical configuration, having a cylindrical axial body section 28a contiguous to body 26 encircling spacer 16a and a smaller outer diameter section 30a of gland 15a and another section 28b diametrically disposed to section 28a, encircling spacer 16b and a smaller diameter section 30b of gland 15b. A pair of diametrically opposed semi-circular flange members 32 and 34 are fixedly connected to an outer perimeter of main comminutor body 26. As shown flange members 32 and 34 have a plurality of circular openings 36 therethrough that are used for mounting the comminutor 22 in service operation.

To continue, comminutor 22 includes an annularly disposed set of stationary cutter/shredder teeth 38 connected to a body member 40 which intermeshes with a rotary cutting/shredding member 42. Torary member 42 has a pair of diametrically opposed cylindrical rotor members 44 and 46 axially disposed within the comminutor. As shown rotary members 44 and 46 have axially disposed cylindrical openings 48 and 50, respectively, therein for receiving, respectively a rotary shaft end 52 of device 10a and a rotary shaft end 54 of device 10b. Each shaft end 52 and 54 is shown with shaft keys 20a and 20b, respectively. The combination shown in FIG. 2 is completed by the presence of a plurality of screw threaded holes 56, in cylindrical axial body sections 28a and 28b, only two of such holes are shown in the drawings, however, three such holes spaced 120 degrees apart axially along the circumference of each body section is required to receive a plurality of bolts 58 which are used to secure devices 10a and 10b to comminutor 22 and a pair of shims 60 and 62 may be required to provide precision axial alignment of devices 10a and 10b, to thereby provide an equivalent unitary rotatable shaft member along axis 24 of the apparatus.

Referring now to FIG. 3, there is shown a detailed view, partly in cross-section, depicting device 10a shown in FIG. 2 connected to comminutor 22. As shown in FIG. 3, device 10a has axially disposed shaft 14a passing through the entire length of the device 10a and coupled to comminutor 22 at its rotor shaft end 52 engaging rotor 44 by means of rotary key 20a. Annular spacer 16a is fixedly connected to shaft 14a adjacent rotor member 44 by means of a dowel pin 64 thereby causing it to rotate with shaft 14a and rotor 44. Dowel pin 64 is disposed in an opening 66 formed in an inner bore 68 of spacer 16a and an opening 70 in shaft 14a. Spacer 16a has a rectangular groove 72 cut into a planar surface 74 perpendicular to axis 24 and remote from rotor 44. Adjacent spacer 16a there is disposed along shaft 14a an annular inner rotary gland member 76 having a small cylindrical section 78 in close fitted contact with shaft 14a adjacent spacer 16a. Section 78 has a small rectangular groove 80 formed in an inner bore 82 of section 78 for receiving an o-ring 84 to provide fluid sealing between shaft 14a and section 78 of inner rotary gland 76. Section 78 and spacer 16a have a roll pin 86 axially disposed locking rotary spacer 16a and rotary inner gland 76 together by means of a roll pin hole in planar surface 74 of spacer 16a and a contacting planar surface 88 of rotary gland 76 Rotary inner gland 76 has an annular L-shaped section 90 connected to annular section 78 to complete rotary gland 76. The L-shaped leg of gland 76 forms a cylindrical opening 92 between an inner bore 95 of inner rotary gland 76 and shaft 14a in an area adjacent thereto. Inner rotary gland 76 is locked in place along shaft 14a by an annular retention ring 94 which is in contact with a planar surface of section 78 within cylindrical opening 92 and is held in place in an annular slot 96 formed in shaft 14a. A second annular inner gland stationary member 98 is disposed along axis 14a adjacent a remote end of rotary inner gland 76. Stationary inner gland member 98 has several inner bores of different diameters, a large bore 100 adjacent L-shaped section 90 of inner rotary gland 76, a second smaller inner bore 102 contiguous thereto and a third inner bore 104 contiguous to bore 102. Inner glands 76 and 98 are disposed in relative spaced apart relationship along shaft 14a, being held in such spaced apart relationship by a fluid seal arrangement 106, comprising a pair of L-shaped annular rings designated first ring 108 and second ring 110, respectively, which are in close contact with each other along one leg of the L to form a T-shaped ring configuration 112 forming a stem where said legs are in contact with one another along a common surface therebetween The stem of the T- shaped configuration is disposed perpendicular to shaft 14a. The L-shaped rings are held in relative fixed spaced relationship to one another and shaft 14a by a first and second annular elastomer rings 114 and 116, respectively, which are disposed one each on either side of the stem of T-shaped member 112 in predetermined compression caused by static inner gland 98 exerting axial pressure against annular elastomer ring 116 as shown in FIG. 3. A fluid sealing arrangement is effectuated by an annular static oil seal gland member 118a, depicted as having a square coss-sectional configuration, in oil sealing contact between shaft 14a and a static inner gland member 98 at said third inner bore 104 thereof. The foregoing arrangement provides a pressure sealing cavity 120 adjacent shaft 14a in a region between it and rotary inner gland 76, elastomer ring 114 and L-shaped ring 108, and L-shaped ring 110, elastomer ring 116 and static inner gland 98.

Continuing with the description of device 10a annular stationary outer housing gland 15a, has a first inner bore 122, a second bore 124 and a third bore 126 and an outer surface configuration having three sections of differing annular dimensions, a first section 128, a second section 130 and a third section 132. A narrow annular cylindrical section 134 is formed between inner bore 122 and first outer surface section 128 of stationary outer gland 15a, which extends axially into rectangular groove 72 of spacer 16a second inner bore section 124 of static gland 15a is coaxially disposed adjacent an outer annular surface of cylindrical section 78 of inner rotary gland 76, while a lower segment of larger third inner bore section 126 of gland 15a is coaxially disposed adjacent and in spaced apart fixed relationship with a remote annular section 135 of inner rotary gland 76 which terminates adjacent a relatively narrow opening 136 in inner bore 126 of gland 15a extending into the body thereof where it intersects a larger opening 138 exiting outer surface section 132. Opening 138 is designated a purge port exit which has screw threads therein for receiving a pipe plug 140 to maintain the fluid seal integrity of device 10a and to bleed or purge the device in the instance when undesirable liquids accumulate in the device Extending axially from opening 138, inner bore of section 126 is in close contact with an outer annular axial surface 142 of static gland 98 and terminates at an annular retainer ring 144 which extends into an annular slot 146 located in the body of gland 15a. The function of retainer ring 144 is to maintain elastomer rings 114 and 116 in axial compression thereby providing a fluid tight pressure seal between L-shaped member 108 and 110 along their common surface of contact of the stem leg of T-shaped ring formed therebetween.

As can be seen in FIG. 3, there is a second opening 148 which extends through outer housing gland 15a. A section of opening 148 has a screw thread therein and pipe plug 150. As shown opening 148 contains a set screw 152 which extends into inner static gland 98 in an annular slot 154 to thereby lock and retain inner gland in fixed stationary relationship with respect to rotable shaft 14a and inner gland 76. Also shown in FIG. 3, is an anti-friction bearing 160a disposed fixedly on shaft 14a by means of an annular inner bearing race 156a thereof, while an outer bearing race 158a is fixedly connected to bearing housing end member 12a. As shown in FIG. 3, with housing 12a in its normal position in device 10a, the device is closed by the addition of an annular snap-in ring oil sealing cap 162 which is fixedly disposed between a drive side end of shaft 14a and a second inner bore 166 of housing 12a. Device 10a may be bolted in place to comminutor 22 by means of a plurality of bolts 58 through the axial openings in bearing housing 12a, outer gland body 15a and cylindrical axial body section 28a of comminutor 22, as noted herein above where section 28a was described as having a plurality of screw threaded holes 56 for receiving bolts 58. To complete the combination of device 10a, five o-rings are utilized, namely o-rings 84, 168 and 170 are external o-rings and are used between an inner bore of comminutor body section 28a and outer stationary gland 15a; while o-rings 172 and 174 are internal o-rings and are utilized between inner bore 142 of outer gland 15a and an outer annular surface of inner stationary gland 98; and o-ring 84 is used between shaft 14a and cylindrical section 78 as illustrated.

Figure 4:
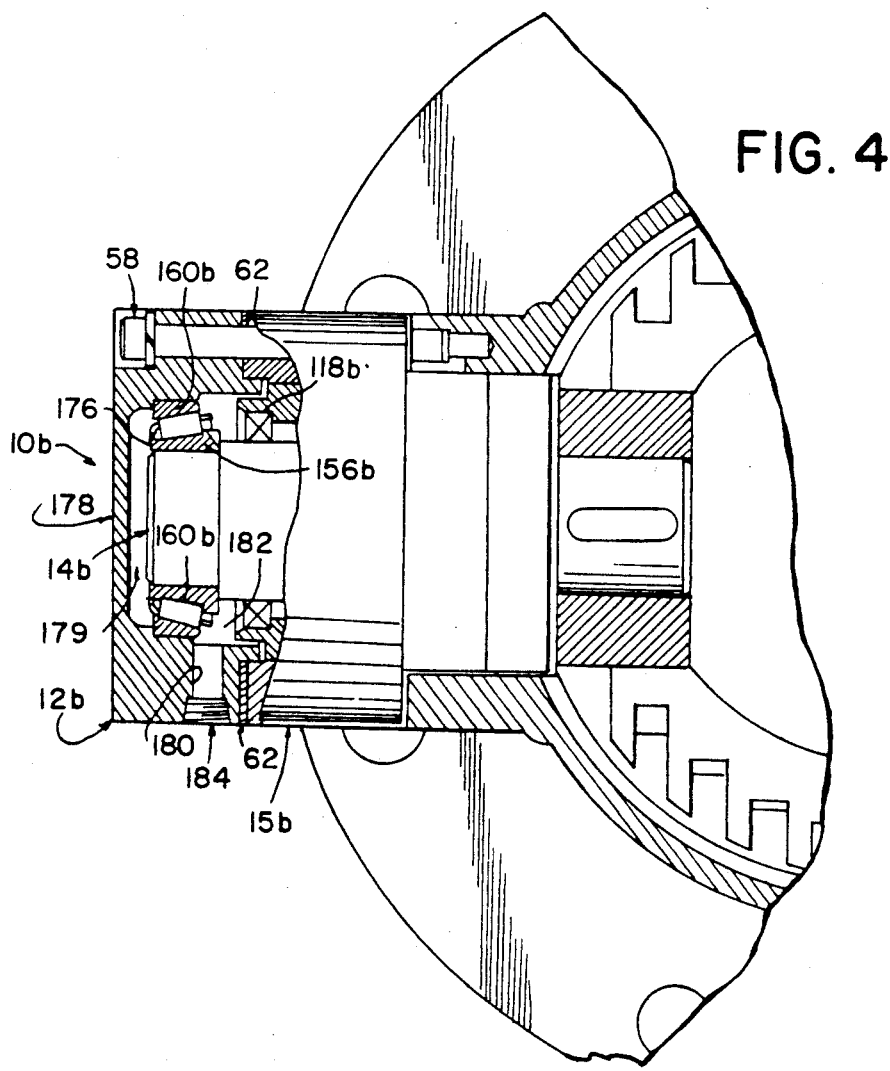
FIG. 4 is a detailed cross-sectional view, in part, of the second unit of the detachable axial device, shown in FIG. 2, depicting a blind-side shaft which is shorter than the driveside shaft shown in FIG. 3.

Referring now to FIG. 4, there is shown a second unit 10b of the detachable pair of axial drive devices as a completed unit partly in cross-section. It is important to note that units 10a and 10b are identical units, except for the interchange of two parts, namely, a rotary blind-end shaft 14b and a blind-side bearing housing end cap member 12b, which corresponds to shaft 14a and bearing housing 12a, respectively.

As shown shaft 14b is a foreshortened version of shaft 14a, and terminates a short axial distance beyond a remote end of 176 of inner race 156b. Bearing housing 12b differs from bearing housing 12a in that it has an end section 178 which is characterized as the blind-side or blind-end cap side and is spaced apart for the terminating end of shaft 14b. The void between the end of shaft 14b and bearing housing 12b creates a chamber 179 where bearing lubricating grease may be disposed as a lubricant for anti-friction bearing 160b.

Continuing with the description of FIG. 4, bearing housing 12b has a port opening 180 in the body of bearing housing 12b which opens into a small annular cavity 182 adjacent bearing 160b, within assembled device 10b, in which a lubricant for bearing housing 160b may reside in cooperation with chamber 179. Port opening 180 contains a grease port plug 184 that is flush with outer surface of bearing housing 12b. The foregoing description of unit 10b completes the discussion of the physical dfferences between the two units, 10a and 10b.

Returning to FIG. 3, the unique features of the self-contained replaceable and detachable two part axial drive shaft devices 10a and 10b are discussed with respect to an internal labyrinth and a pressure sealing arrangement therein and the means for purging the unites of undesirable problem fluids while they are in operation, and the relative ease with which either or both units 10a and 10b may be replaced to minimize operational down time of an associated apparatus, such as a cutting/shredding comminutor, for example, to which the two units may be connected to provide a unitary drive shaft therefor.

An internal labyrinth path of the device depicted in FIG. 3 is commenced at a passage entrance 186 between device 10a spacer 16a and stationary body member 40 of comminutor 22. The labyrinth path procede axially between the outer annular surface of spacer 16a on one side and annular body member 40 and an annular inner body surface 188 of body section 28a of comminutor 22, then proceeds perpendicular to axis 24 and then continues along a U-shaped path formed between slot section 134 and section 128 of static gland 15a proceeding next along a zig-zag like path formed between three inner bores of outer housing gland 15a on the one side and an outer Z-shaped surface of annular inner rotary gland 76 that terminates a narrow opening 136 in gland 15a, which opens into large port opening 138. It can be seen and appreciated from the drawing that the presence of undesirable fluids which may work their way into device 10a along the labyrinth path described hereinabove, can be either drained off through port opening 138 by removal of pipe plug 140 or the labyrinth path may be purged by attaching a suitable pressure fluid purging device to port opening 138 and pumping a purging fluid therethrough for discharge at labyrinth entrance 186.

Continuing with the description of device 10a, the pressure sealing arrangement comprises an axially disposed annular inner static gland 98, elastomer rings 14 and 116, L-shaped annular rings 108 and 110, inner annular rotary gland 76 and rotary spacer 16a.

In operation, the pressure sealing arrangement comprises two sections. The first section includes spacer 16a, inner rotary gland 76, elastomer ring 114 and L-shaped annular ring 108. The foregoing elemental components are fixedly locked in annular spaced relationship with shaft 14a at an end nearest to rotor end 52 thereof. Spacer 16a is locked to shaft 14a by dowel pin 64 and is held in fixed contact by ring 95. L-shaped ring 108 and elastomer ring 114 are held wedged axially against gland 76 by a constant axial compression force applied to L-shaped ring 108 through L-shaped ring 110 along their common contact leg which forms a stem let of T-shaped ring configuration 112. The common abutting surface of these L-shaped rings, while under pressure of sealing axial forces, are highly polished surfaces and therefore permit ring 108 to rotate with respect to shaft 14a while ring 110 remains static during such rotation, and while maintaining a fluid pressure seal therebetween. This fluid sealing rotational characteristic between these rings is one of the unique features of the pressure fluid seal arrangement 106 in accordance with the teachings of the present invention.

Another unique feature of the present invention arises from the ease with which devices 10a and 10b may readily be detached from an associated apparatus, such as comminutor 22, for example, to which they may be connected and effectively used. As can readily be seen and appreciated by one skilled in the art of shaft couplings, the rotor shaft ends 52 and 54 may be connected to or detached from rotor member 44 or 46, respectively, simply by removal of axial bolts 58 and dislodging rotary keys 20a and 20b, respectively, which in turn permits device 10a or 10b to be detached and disconnected from comminutor 22 by pulling the cartridges axially away from the comminutor. In a similar manner, the ease with which a cartridge 10a or 10b, may be connected to an apparatus such as comminutor 22 can readily be appreciated and understood by one skilled in the art of such devices.

In closing, it is noteworthy to summarize the novel and useful advantages of the present invention namely:

a. provision of a pair of self contained detachable/interchangeable cartridges which in combination produce an effective unitary or equivalent ridge one piece functional axial shaft drive device for a variety of compatable apparatuses;

b. provision of a labyrinth path with the cartridge to prevent the ready accumulation of problem fluids therein and to provide means for purging the cartridge in the event of such accumulation of fluids; and c. provision of means of isolating the anti-friction bearing within the cartridge by use of a unique pressure sealing arrangement contained therein.

It is understood that the above embodiments are only illustrative of the principals applicable to the invention. Various modifications and adaptations may be envisioned by those skilled in the art when exposed to the disclosure and teachings herein, without departing from the spirit and scope of the invention and the claims appended hereto.

What is claimed as new, is:

1. An improved detachable cartridge assembly having a body for a shaft supported at one end by an anti-friction bearing for rotation about its axis within a housing bore of said cartridge to provide means for producing rotational drive power along said shaft, the improvement comprising:

a. a shaft having a first and second end disposed axially within said cartridge having a rotor key affixed at said first end and a drive key affixed at said second end, said shaft being axially supported near said first end by an annular spacer which is linked thereto and by said anti-friction bearing near said second end of said shaft;

b. a first section of an annular stationary outer housing gland and an inner rotary gland disposed in coaxial fixed spaced apart relationship with said outer gland and axially disposed adjacent and linked to said spacer and coaxial with said shaft, said spaced apart relationship between said outer and inner glands forming a labyrinth path along said shaft axis within said cartridge assembly for creating a tortuous flow passageway to liquid flow therethrough;

c. said inner rotary gland and an inner annular static gland being disposed in fixed axial spaced apart relationship about said shaft, a second section of said stationary gland being coaxially and fixedly disposed with said inner static gland, said coaxially disposed inner static gland and said second section of said outer stationary gland extending axially and terminating near said anti-friction bearing;

d. a pressure sealing arrangement disposed between said spaced apart adjacent ends of said axially disposed inner rotary and static glands and coaxial with said shaft;

e. a static oil gland seal ring disposed coaxially between said shaft and inner static gland nearest to said second end of said shaft to prevent fluid leakage therebetween within said cartridge; and f. a plurality of axial spaced apart openings in said body of said cartridge for receiving a plurality of bolts for connecting or disconnecting said cartridge and an associated apparatus.

2. An improved detachable cartridge assembly of claim 1 in which, said labyrinth path exits an exit opening through said outer stationary housing gland, said exit opening providing access to said labyrinth path for purging said path of undesirable liquid which may become entrapped therealong.

3. An improved detached cartridge assembly of claim 1 in which, a pressure seal cavity is formed between an annular section of said shaft on one side and said inner rotary gland, pressure sealing arrangement and inner static gland on another side, which is closed off by said static oil gland seal ring.

4. An improved detached cartridge of claim 3 in which, said pressure seal arrangement consists of a pair of L-shaped rings in abutting surface bearing contact along one leg of each ring having equal lengths, forming an annular T-shaped ring coaxial with said shaft, said L-shaped rings being held in relative tight fluid moving contact along said abutting surfaces, which are perpendicular to said shaft axis, by a pair of elastomer rings disposed on opposite sides of said abutting surfaces under axial compression exerted thereon by said elastomer being squeezed axially between said spaced apart abutting inner rotary and inner static glands.

5. An improved cartridge of claim 4 in which, said spacer, inner rotary gland, a first elastomer ring of said pair of elastomer rings, and one of said pair of L-shaped rings in pressure contact with said one of said pair of L-shaped rings all rotate as the shaft rotates, while said other L-shaped ring and elastomer ring, inner static gland and static gland oil seal remain stationary as said shaft rotates.

6. An improved detachable cartridge assembly of claim 1 in which, said second end of said shaft is a blindside end which terminates flush with said anti-friction bearing after passing axially therethrough and has no drive key affixed at said second end.

7. An improved two part detachable axial shaft drive system each part having a system enclosure body and a shaft contained therein supported at one end by an anti-friction bearing and another end adapted for rigidly engaging a rotatable member of an associated apparatus disposed therebetween, the improvement comprising:
   a. a first and second detachable axial mountable cartridge each having a shaft with a rotor key end which extends axially outside said cartridge;
   b. said shaft of said first cartridge having a drive side key end axially extending outside said cartridge to which an external rotary power drive source may be connected to provide rotational motion along said shaft to said associated apparatus;
   c. said shaft of said second cartridge having a blindside end which terminates flush with said anti-friction bearing after passing axially therethrough and is enclosed within said cartridge;
   d. a one piece rotatable member of an associated apparatus having axially disposed spaced apart coupling rotors with axial openings therethrough for receiving and rigidly engaging said rotor key ends of said first and second cartridges and said rotatable member; and
   e. a plurality of axially spaced apart openings in each said enclosure body for receiving a plurality of bolts for connecting or disconnecting said drive system and an associated apparatus.

8. An improved two part detachable axial drive system of claim 7 in which, said anti-friction bearing supports of said cartridges are protected by an internal labyrinth liquid flow resistance path and a pressure seal arrangement contained within each of said cartridges.

9. An improved two part detachable axial drive system of claim 8 in which, access to said labyrinth path may be had through an exit purge port opening in said system enclosure.

10. An improved fluid pressure assisted rotating shaft seal of a replaceable cartridge assembly for sealing a shaft supported for rotation about its axis within a housing bore of said cartridge by an anti friction bearing interposed between the shaft and the housing bore, said shaft having a rotary key end and a drive key end, said seal and cartridge assembly comprising:
   a. an annular spacer member and an inner rotary gland member operatively fixed to one another and disposed coaxially adjacent said rotary key end of said shaft;
   b. an annular inner static gland member operatively disposed in fixed spaced apart coaxial relationship with said shaft and spaced apart abutting relationship adjacent said inner rotary gland along said shaft;
   c. an annular pressure seal mechanism including a pair of L-shaped rings in abutting surface bearing contact along one leg of each ring of equal lengths, forming an annular T-shaped ring co-axial with said shaft, said L-shaped rings being held in relative fluid tight contact along said abutting surface, which is perpendicular to said shaft axis, by a pair of elastomer rings oppositely disposed along each leg of said abutting surfaces resulting from compression exerted thereon by said elastomer rings being squeezed axially between said inner rotary and static glands;
   d. an annular static gland oil seal disposed coaxially between said shaft and a remote end of said inner static gland, thereby completing the formation of a pressure seal cavity along a segment of said shaft and said inner rotary gland, said pressure seal mechanism and said inner static gland;
   e. an anti-friction bearing having an outer and inner race, said inner race being operatively fixed to said shaft and disposed adjacent said remote end of said inner static gland;
   f. an annular outer gland housing body member having a plurality of inner bores for receiving said inner rotary and static gland members including said pressure seal mechanism and static gland oil seal disposed coaxially with said shaft, said inner static gland being fixed to said outer housing gland bore by an annular snap-retaining ring disposed near said remote end of said inner static gland and a set-screw passing through a set-screw opening in said outer housing gland into an annular peripheral slot in said inner static gland adjacent said set screw opening;
   g. an annular drive side bearing housing end member having a plurality of inner bores, said outer race of said anti-friction bearing being operatively connected in one of said plurality of inner bores and being operatively connected to said outer housing gland body by means of a plurality of bolts passing through said bearing housing parallel to said shaft into said outer gland housing; and
   h. an annular snap-ring oil seal cap fixedly disposed along axis adjacent said anti-friction bearing in one of said plurality of inner bores of said bearing housing forming an oil chamber between said oil cap and bearing, and sealing off said cartridge near said drive key and of said shaft which passes through an opening in said housing end member.

* * * * *